(12) United States Patent
Chen

(10) Patent No.: US 10,530,816 B2
(45) Date of Patent: Jan. 7, 2020

(54) METHOD FOR DETECTING THE USE OF UNAUTHORIZED SECURITY CREDENTIALS IN CONNECTED VEHICLES

(71) Applicant: NIO USA, Inc., San Jose, CA (US)

(72) Inventor: Abraham T. Chen, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 285 days.

(21) Appl. No.: 15/599,256

(22) Filed: May 18, 2017

(65) Prior Publication Data

US 2018/0337957 A1    Nov. 22, 2018

(51) Int. Cl.

| | |
|---|---|
| *H04L 29/06* | (2006.01) |
| *H04L 9/32* | (2006.01) |
| *H04L 9/00* | (2006.01) |
| *H04W 12/02* | (2009.01) |
| *G06F 21/33* | (2013.01) |
| *G06F 21/85* | (2013.01) |
| *H04W 12/10* | (2009.01) |
| *H04W 12/12* | (2009.01) |
| *H04W 12/00* | (2009.01) |
| *H04W 4/40* | (2018.01) |

(52) U.S. Cl.
CPC ............ *H04L 63/205* (2013.01); *G06F 21/33* (2013.01); *G06F 21/85* (2013.01); *H04L 9/006* (2013.01); *H04L 9/3268* (2013.01); *H04L 63/0428* (2013.01); *H04L 63/06* (2013.01); *H04L 63/0823* (2013.01); *H04W 12/00502* (2019.01); *H04W 12/02* (2013.01); *H04W 12/10* (2013.01); *H04W 12/12* (2013.01); *H04L 2209/80* (2013.01); *H04L 2209/84* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 6,816,900 | B1 | 11/2004 | Vogel et al. |
| 7,131,003 | B2 | 10/2006 | Lord et al. |
| 7,640,428 | B2 | 12/2009 | Adams et al. |
| 2002/0023223 | A1* | 2/2002 | Schmidt ................. B60R 25/24 713/187 |
| 2004/0230803 | A1* | 11/2004 | Kuhls ..................... G06F 21/33 713/176 |

(Continued)

*Primary Examiner* — Jason Chiang
(74) *Attorney, Agent, or Firm* — Sheridan Ross P.C.

(57) ABSTRACT

Embodiments of the present disclosure monitor certificates or other credentials loaded to various components and systems of a vehicle. A set of information identifying credentials that are expected to be present and/or in use can be saved. Periodically, on request, or upon the occurrence of an event or condition, checks can be performed on the credentials individually or in the aggregate using the saved information to determine whether the certificates present and/or in use are those expected or if a change has occurred. If a change is detected, i.e., a difference between the current set of certificates and the saved set of information, the network security system can take some action. The action, depending on the nature of the change detected, can vary from recording and/or reporting the condition up to and including isolating or even disabling a particular component or system on which the changed certificate is used.

14 Claims, 8 Drawing Sheets

(56) References Cited

U.S. PATENT DOCUMENTS

| | | | |
|---|---|---|---|
| 2008/0182592 A1* | 7/2008 | Cha | H04L 63/04 455/456.3 |
| 2009/0132813 A1* | 5/2009 | Schibuk | G06Q 20/223 713/158 |
| 2009/0179775 A1* | 7/2009 | Bos | G08G 1/0962 340/905 |
| 2009/0235071 A1* | 9/2009 | Bellur | H04L 9/3268 713/158 |
| 2011/0295444 A1* | 12/2011 | Westra | G06F 21/30 701/1 |
| 2014/0108787 A1* | 4/2014 | Ando | H04L 63/0823 713/156 |
| 2016/0285832 A1* | 9/2016 | Petrov | H04L 63/0428 |
| 2018/0083986 A1* | 3/2018 | Hurley | H04L 63/083 |

\* cited by examiner

METHOD FOR DETECTING THE USE OF UNAUTHORIZED SECURITY CREDENTIALS IN CONNECTED VEHICLES

FIELD

The present disclosure is generally directed to vehicle systems, in particular, toward vehicle security systems and more specifically to detecting the presence of unauthorized security credentials.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles. Additionally, network communication and other technologies have been adapted to use in vehicles to provide information, entertainment, conveniences, and other benefits. For example, a Controller Area Network (CAN) of the vehicle typically supports communications between a main controller of the vehicle and Electronic Control Units (ECUs) for a variety of vehicle components and systems while an "infotainment" network can connect in-vehicle entertainment and/or information systems and, in many cases, provide Internet or other network connectivity to the vehicle.

However, these technologies can also present certain risks and vulnerabilities. For example, malicious, unauthorized access to the entertainment and/or information network can compromise personal information possibly leading to identify theft. In the case of an autonomous or semi-autonomous vehicle, these risks and vulnerabilities are not only security and privacy concerns but are also significant personal and public safety concerns. To prevent hacking or other unauthorized access to these networks and systems, security credentials such as Public Key Infrastructure (PKI) and other certificates can be used to authenticate and authorize communications on the networks and access to the systems of the vehicle. However, such security credentials are also subject to attack by being altered or replaced. Hence there is a need for methods and systems to detect tampering with such security credentials or the presence of unauthorized security credentials in the vehicle.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
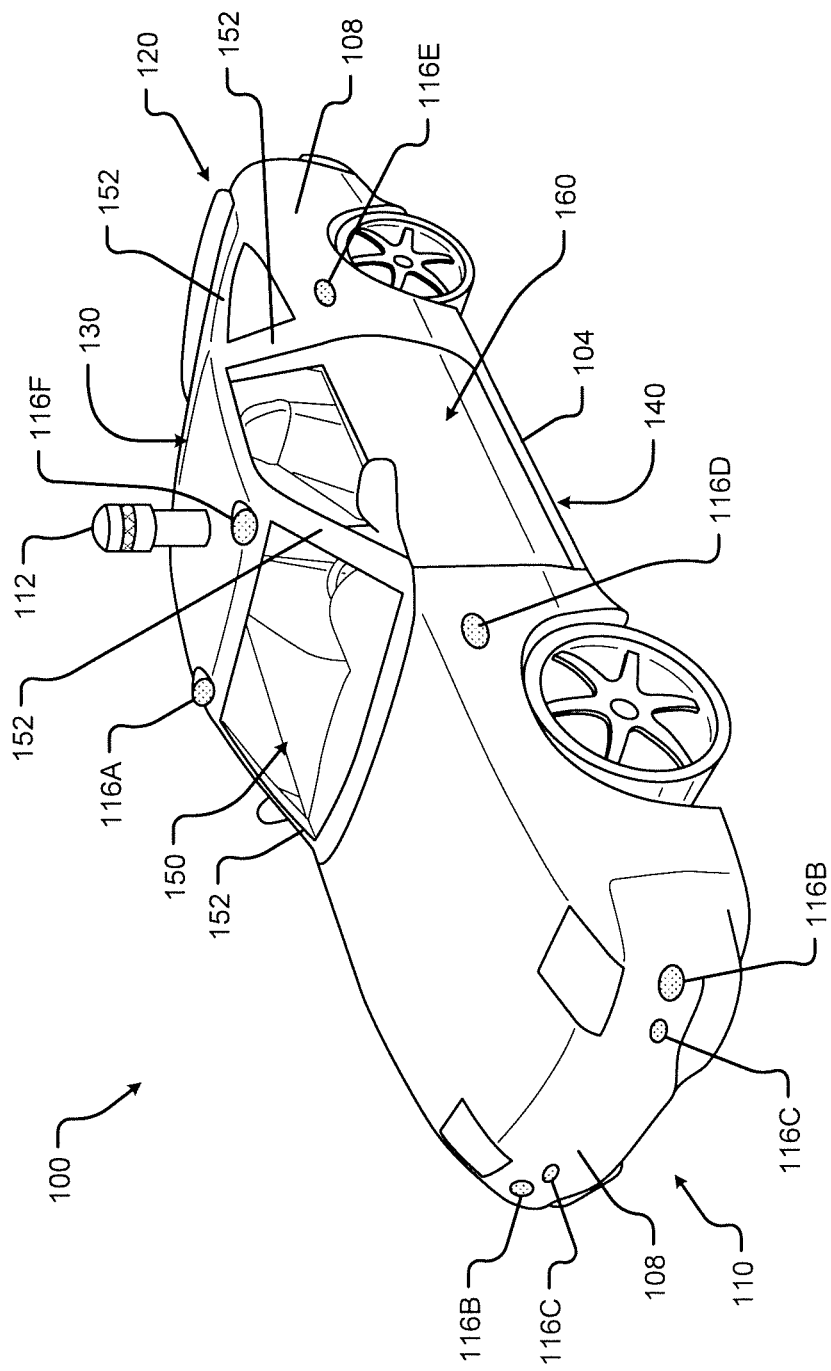
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations, e.g., autonomous or semi-autonomous control. Examples of the various sensors and systems may include, but are in no way limited to, one or more of cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR (Light Imaging, Detection, And Ranging) systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIG. 1 may be disposed in, on, and/or about the vehicle 100 in any position, area, and/or zone of the vehicle 100.

Figure 2:
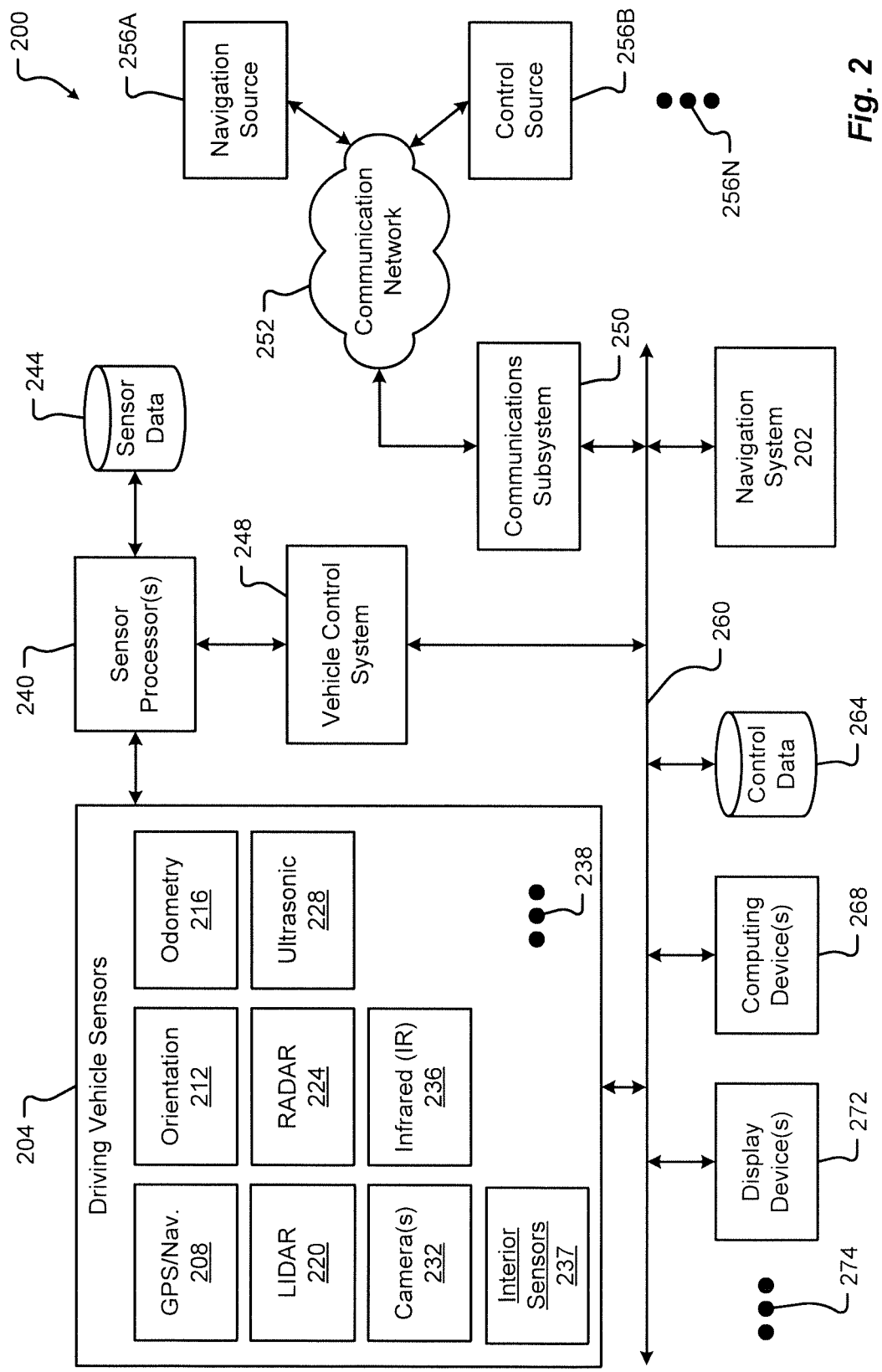
FIG. 2 is a block diagram of an embodiment of a communication environment of the vehicle in accordance with embodiments of the present disclosure.

FIG. 2 is a block diagram of an embodiment of a communication environment 200 of the vehicle 100 in accordance with embodiments of the present disclosure. The communication system 200 may include one or more vehicle driving vehicle sensors and systems 204, sensor processors 240, sensor data memory 244, vehicle control system 248, communications subsystem 250, control data 264, computing devices 268, display devices 272, and other components 274 that may be associated with a vehicle 100. These associated components may be electrically and/or communicatively coupled to one another via at least one bus 260. In some embodiments, the one or more associated components may send and/or receive signals across a communication network 252 to at least one of a navigation source 256A, a control source 256B, or some other entity 256N.

In accordance with at least some embodiments of the present disclosure, the communication network 252 may comprise any type of known communication medium or collection of communication media and may use any type of protocols, such as SIP, TCP/IP, SNA, IPX, AppleTalk, and the like, to transport messages between endpoints. The communication network 252 may include wired and/or wireless communication technologies. The Internet is an example of the communication network 252 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 252 need not be limited to any one network type, and instead may be comprised of a number of different networks and/or network types. The communication network 252 may comprise a number of different communication media such as coaxial cable, copper cable/wire, fiber-optic cable, antennas for transmitting/receiving wireless messages, and combinations thereof.

The driving vehicle sensors and systems 204 may include at least one navigation 208 (e.g., global positioning system (GPS), etc.), orientation 212, odometry 216, LIDAR 220, RADAR 224, ultrasonic 228, camera 232, infrared (IR) 236, and/or other sensor or system 238. These driving vehicle sensors and systems 204 may be similar, if not identical, to the sensors and systems 116A-K, 112 described in conjunction with FIG. 1.

The navigation sensor 208 may include one or more sensors having receivers and antennas that are configured to utilize a satellite-based navigation system including a network of navigation satellites capable of providing geolocation and time information to at least one component of the vehicle 100. Examples of the navigation sensor 208 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 212 may include one or more sensors configured to determine an orientation of the vehicle 100 relative to at least one reference point. In some embodiments, the orientation sensor 212 may include at least one pressure transducer, stress/strain gauge, accelerometer, gyroscope, and/or geomagnetic sensor. Examples of the navigation sensor 208 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec BMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, which may perform orientation detection and/or determination functions using any known or future-developed standard and/or architecture.

The odometry sensor and/or system 216 may include one or more components that is configured to determine a change in position of the vehicle 100 over time. In some embodiments, the odometry system 216 may utilize data from one or more other sensors and/or systems 204 in determining a position (e.g., distance, location, etc.) of the vehicle 100 relative to a previously measured position for the vehicle 100. Additionally or alternatively, the odometry sensors 216 may include one or more encoders, Hall speed sensors, and/or other measurement sensors/devices configured to measure a wheel speed, rotation, and/or number of revolutions made over time. Examples of the odometry sensor/system 216 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 220 may include one or more components configured to measure distances to targets using laser illumination. In some embodiments, the LIDAR sensor/system 220 may provide 3D imaging data of an environment around the vehicle 100. The imaging data may be processed to generate a full 360-degree view of the environment around the vehicle 100. The LIDAR sensor/system 220 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 220 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 220 may detect when light from the plurality of laser beams emitted into the measurement environment returns (e.g., reflected echo) to the LIDAR sensor/system 220. The LIDAR sensor/system 220 may calculate, based on a time associated with the emission of light to the detected return of light, a distance from the vehicle 100 to the illuminated target. In some embodiments, the LIDAR sensor/system 220 may generate over 2.0 million points per second and have an effective operational range of at least 100 meters. Examples of the LIDAR sensor/system 220 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 224 may include one or more radio components that are configured to detect objects/targets in an environment of the vehicle 100. In some embodiments, the RADAR sensors 224 may determine a distance, position, and/or movement vector (e.g., angle, speed, etc.) associated with a target over time. The RADAR sensors 224 may include a transmitter configured to generate and emit electromagnetic waves (e.g., radio, microwaves, etc.) and a receiver configured to detect returned electromagnetic waves. In some embodiments, the RADAR sensors 224 may include at least one processor configured to interpret the returned electromagnetic waves and determine locational properties of targets. Examples of the RADAR sensors 224 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 228 may include one or more components that are configured to detect objects/targets in an environment of the vehicle 100. In some embodiments, the ultrasonic sensors 228 may determine a distance, position, and/or movement vector (e.g., angle, speed, etc.) associated with a target over time. The ultrasonic sensors 228 may include an ultrasonic transmitter and receiver, or transceiver, configured to generate and emit ultrasound waves and interpret returned echoes of those waves. In some embodiments, the ultrasonic sensors 228 may include at least one processor configured to interpret the returned ultrasonic waves and determine locational properties of targets. Examples of the ultrasonic sensors 228 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 232 may include one or more components configured to detect image information associated with an environment of the vehicle 100. In some embodiments, the camera sensors 232 may include a lens, filter, image sensor, and/or a digital image processer. It is an aspect of the present disclosure that multiple camera sensors 232 may be used together to generate stereo images providing depth measurements. Examples of the camera sensors 232 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 236 may include one or more components configured to detect image information associated with an environment of the vehicle 100. The IR sensors 236 may be configured to detect targets in low-light, dark, or poorly-lit environments. The IR sensors 236 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 236 may include at least one processor configured to interpret the returned IR light and determine locational properties of targets. The IR sensors 236 may be configured to detect and/or measure a temperature associated with a target (e.g., an object, pedestrian, other vehicle, etc.). Examples of IR sensors 236 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

A navigation system 202 can include any hardware and/or software used to navigate the vehicle either manually or autonomously. The navigation system 202 may be as described in conjunction with FIG. 3.

In some embodiments, the driving vehicle sensors and systems 204 may include other sensors 238 and/or combinations of the sensors 206-237 described above. Additionally or alternatively, one or more of the sensors 206-237 described above may include one or more processors configured to process and/or interpret signals detected by the one or more sensors 206-237. In some embodiments, the processing of at least some sensor information provided by the vehicle sensors and systems 204 may be processed by at least one sensor processor 240. Raw and/or processed sensor data may be stored in a sensor data memory 244 storage medium. In some embodiments, the sensor data memory 244 may store instructions used by the sensor processor 240 for processing sensor information provided by the sensors and systems 204. In any event, the sensor data memory 244 may be a disk drive, optical storage device, solid-state storage device such as a random access memory ("RAM") and/or a read-only memory ("ROM"), which can be programmable, flash-updateable, and/or the like.

The vehicle control system 248 may receive processed sensor information from the sensor processor 240 and determine to control an aspect of the vehicle 100. Controlling an aspect of the vehicle 100 may include presenting information via one or more display devices 272 associated with the vehicle, sending commands to one or more computing devices 268 associated with the vehicle, and/or controlling a driving operation of the vehicle. In some embodiments, the vehicle control system 248 may correspond to one or more computing systems that control driving operations of the vehicle 100 in accordance with the Levels of driving autonomy described above. In one embodiment, the vehicle control system 248 may operate a speed of the vehicle 100 by controlling an output signal to the accelerator and/or braking system of the vehicle. In this example, the vehicle control system 248 may receive sensor data describing an environment surrounding the vehicle 100 and, based on the sensor data received, determine to adjust the acceleration, power output, and/or braking of the vehicle 100. The vehicle control system 248 may additionally control steering and/or other driving functions of the vehicle 100.

The vehicle control system 248 may communicate, in real-time, with the driving sensors and systems 204 forming a feedback loop. In particular, upon receiving sensor information describing a condition of targets in the environment surrounding the vehicle 100, the vehicle control system 248 may autonomously make changes to a driving operation of the vehicle 100. The vehicle control system 248 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 204, vehicle control system 248, display devices 272, etc.) may communicate across the communication network 252 to one or more entities 256A-N via a communications subsystem 250 of the vehicle 100. Embodiments of the communications subsystem 250 are described in greater detail in conjunction with FIG. 4. For instance, the navigation sensors 208 may receive global positioning, location, and/or navigational information from a navigation source 256A. In some embodiments, the navigation source 256A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 248 may receive control information from one or more control sources 256B. The control source 256 may provide vehicle control information including autonomous driving control commands, vehicle operation override control commands, and the like. The control source 256 may correspond to an autonomous vehicle control system, a traffic control system, an administrative control entity, and/or some other controlling server. It is an aspect of the present disclosure that the vehicle control system 248 and/or other components of the vehicle 100 may exchange communications with the control source 256 across the communication network 252 and via the communications subsystem 250.

Information associated with controlling driving operations of the vehicle 100 may be stored in a control data memory 264 storage medium. The control data memory 264 may store instructions used by the vehicle control system 248 for controlling driving operations of the vehicle 100, historical control information, autonomous driving control rules, and the like. In some embodiments, the control data memory 264 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 3:
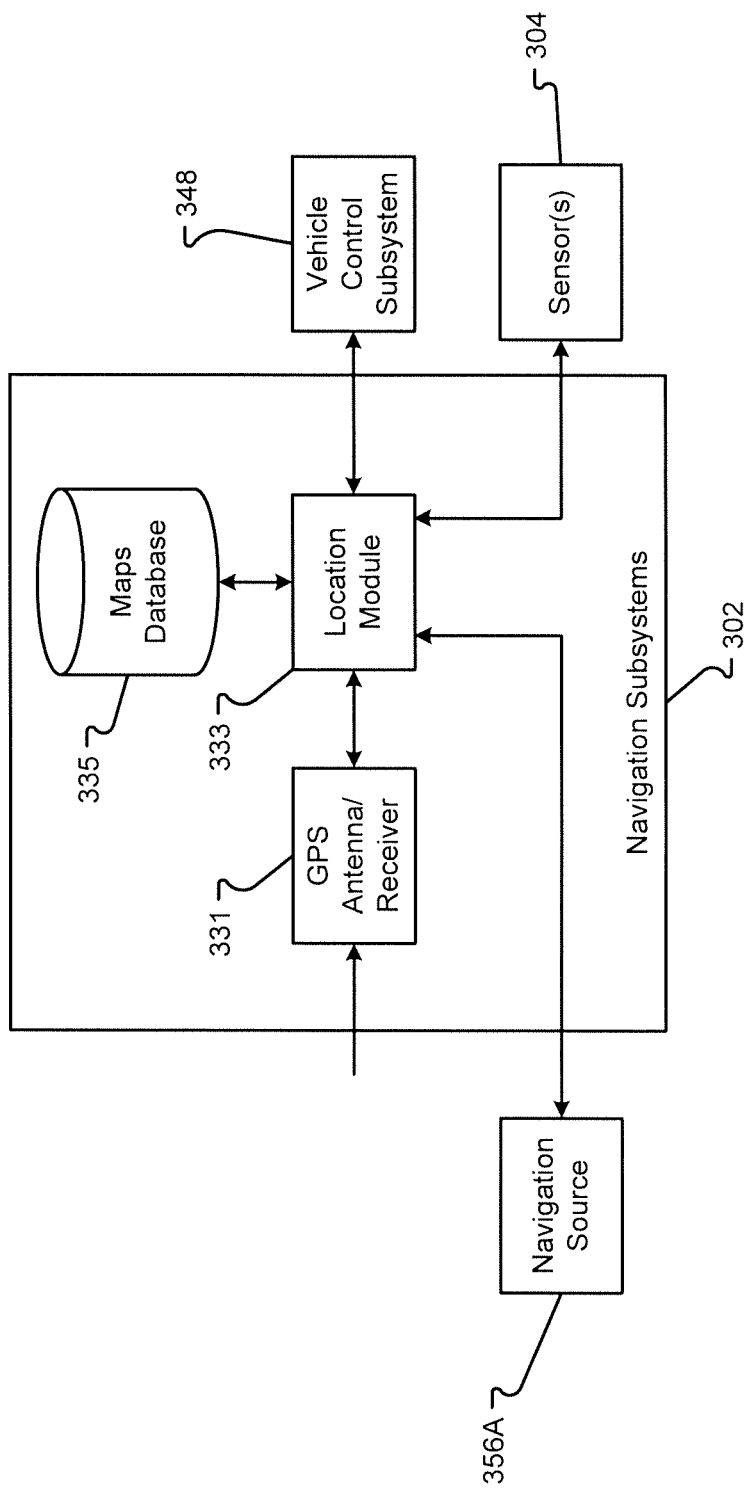
FIG. 3 is a block diagram of an embodiment of a navigation system of the vehicle in accordance with embodiments of the present disclosure.

FIG. 3 illustrates a GPS/Navigation subsystem(s) 302. The navigation subsystem(s) 302 can be any present or future-built navigation system that may use location data, for example, from the Global Positioning System (GPS), to provide navigation information or control the vehicle 100. The navigation subsystem(s) 302 can include several components, such as, one or more of, but not limited to: a GPS Antenna/receiver 331, a location module 333, a maps database 335, etc. Generally, the several components or modules 331-335 may be hardware, software, firmware, computer readable media, or combinations thereof.

A GPS Antenna/receiver 331 can be any antenna, GPS puck, and/or receiver capable of receiving signals from a GPS satellite or other navigation system. The signals may be demodulated, converted, interpreted, etc. by the GPS Antenna/receiver 331 and provided to the location module 333. Thus, the GPS Antenna/receiver 331 may convert the time signals from the GPS system and provide a location (e.g., coordinates on a map) to the location module 333. Alternatively, the location module 333 can interpret the time signals into coordinates or other location information.

The location module 333 can be the controller of the satellite navigation system designed for use in the vehicle 100. The location module 333 can acquire position data, as from the GPS Antenna/receiver 331, to locate the user or vehicle 100 on a road in the unit's map database 335. Using the road database 335, the location module 333 can give directions to other locations along roads also in the database 335. When a GPS signal is not available, the location module 333 may apply dead reckoning to estimate distance data from sensors 304 including one or more of, but not limited to, a speed sensor attached to the drive train of the vehicle 100, a gyroscope, an accelerometer, etc. Additionally or alternatively, the location module 333 may use known locations of Wi-Fi hotspots, cell tower data, etc. to determine the position of the vehicle 100, such as by using time difference of arrival (TDOA) and/or frequency difference of arrival (FDOA) techniques.

The maps database 335 can include any hardware and/or software to store information about maps, geographical information system (GIS) information, location information, etc. The maps database 335 can include any data definition or other structure to store the information. Generally, the maps database 335 can include a road database that may include one or more vector maps of areas of interest. Street names, street numbers, house numbers, and other information can be encoded as geographic coordinates so that the user can find some desired destination by street address. Points of interest (waypoints) can also be stored with their geographic coordinates. For example, a point of interest may include speed cameras, fuel stations, public parking, and "parked here" (or "you parked here") information. The maps database 335 may also include road or street characteristics, for example, speed limits, location of stop lights/stop signs, lane divisions, school locations, etc. The map database contents can be produced or updated by a server connected through a wireless system in communication with the Internet, even as the vehicle 100 is driven along existing streets, yielding an up-to-date map.

Figure 4:
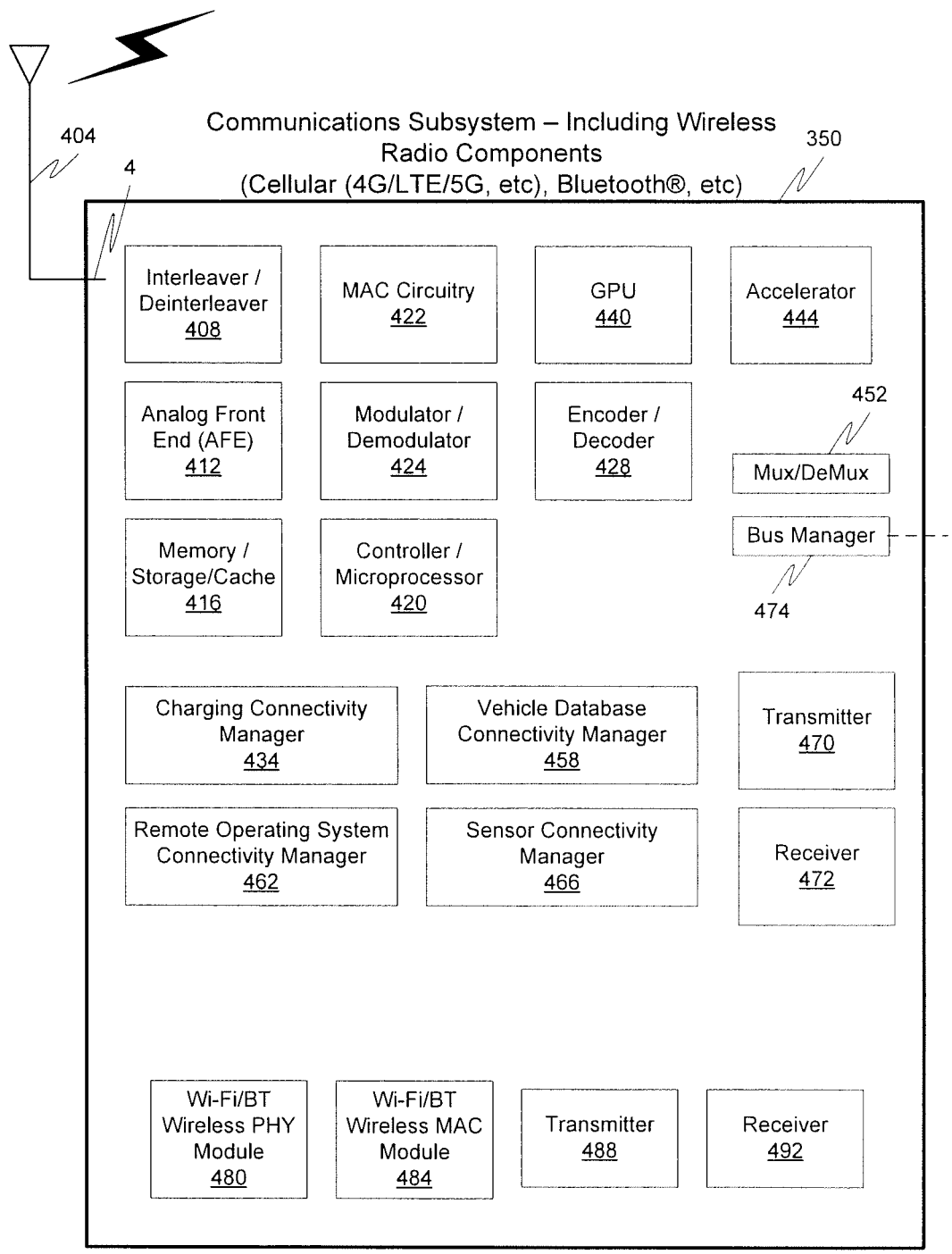
FIG. 4 is a block diagram of an embodiment of a communications subsystem of the vehicle.

FIG. 4 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 474), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any of the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 404, an interleaver/deinterleaver 408, an analog front end (AFE) 412, memory/storage/cache 416, controller/microprocessor 420, MAC circuitry 422, modulator/demodulator 424, encoder/decoder 428, a plurality of connectivity managers 434, 458, 462, 466, GPU 440, accelerator 444, a multiplexer/demultiplexer 452, transmitter 470, receiver 472 and additional wireless radio components such as a Wi-Fi PHY/Bluetooth® module 480, a Wi-Fi/BT MAC module 484, additional transmitter(s) 488 and additional receiver(s) 492. The various elements in the device 350 are connected by one or more links/busses 4 (not shown, again for sake of clarity).

The device 350 can have one more antennas 404, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 404 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 404 generally interact with the Analog Front End (AFE) 412, which is needed to enable the correct processing of the received modulated signal and signal conditioning for a transmitted signal. The AFE 412 can be functionally located between the antenna and a digital baseband system in order to convert the analog signal into a digital signal for processing and vice-versa.

The subsystem 350 can also include a controller/microprocessor 420 and a memory/storage/cache 416. The subsystem 350 can interact with the memory/storage/cache 416 which may store information and operations necessary for configuring and transmitting or receiving the information described herein. The memory/storage/cache 416 may also be used in connection with the execution of application programming or instructions by the controller/microprocessor 420, and for temporary or long term storage of program instructions and/or data. As examples, the memory/storage/cache 420 may comprise a computer-readable device, RAM, ROM, DRAM, SDRAM, and/or other storage device(s) and media.

The controller/microprocessor 420 may comprise a general purpose programmable processor or controller for executing application programming or instructions related to the subsystem 350. Furthermore, the controller/microprocessor 420 can perform operations for configuring and transmitting/receiving information as described herein. The controller/microprocessor 420 may include multiple processor cores, and/or implement multiple virtual processors. Optionally, the controller/microprocessor 420 may include multiple physical processors. By way of example, the controller/microprocessor 420 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter(s) 470, 488 and receiver(s) 472, 492 which can transmit and receive signals, respectively, to and from other devices, subsystems and/or other destinations using the one or more antennas 404 and/or links/busses. Included in the subsystem 350 circuitry is the medium access control or MAC Circuitry 422. MAC circuitry 422 provides for controlling access to the wireless medium. In an exemplary embodiment, the MAC circuitry 422 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 440, an accelerator 444, a Wi-Fi/BT/BLE (Bluetooth® Low-Energy) PHY module 480 and a Wi-Fi/BT/BLE MAC module 484 and optional wireless transmitter 488 and optional wireless receiver 492. In some embodiments, the GPU 440 may be a graphics processing unit, or visual processing unit, comprising at least one circuit and/or chip that manipulates and changes memory to accelerate the creation of images in a frame buffer for output to at least one display device. The GPU 440 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 434, 458, 462, 466 manage and/or coordinate communications between the subsystem 350 and one or more of the systems disclosed herein and one or more other devices/systems. The connectivity managers 434, 458, 462, 466 include a charging connectivity manager 434, a vehicle database connectivity manager 458, a remote operating system connectivity manager 462, and a sensor connectivity manager 466.

The charging connectivity manager 434 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 434 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 458 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 462 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 466 facilitates communications between any one or more of the vehicle sensors (e.g., the driving vehicle sensors and systems 304, etc.) and any one or more of the other vehicle systems. The sensor connectivity manager 466 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (Internet Protocol) address(es), associated with the vehicle and one or other system or subsystems or components and/or devices therein. These identifiers can be used in conjunction with any one or more of the connectivity managers as discussed herein.

Figure 5:
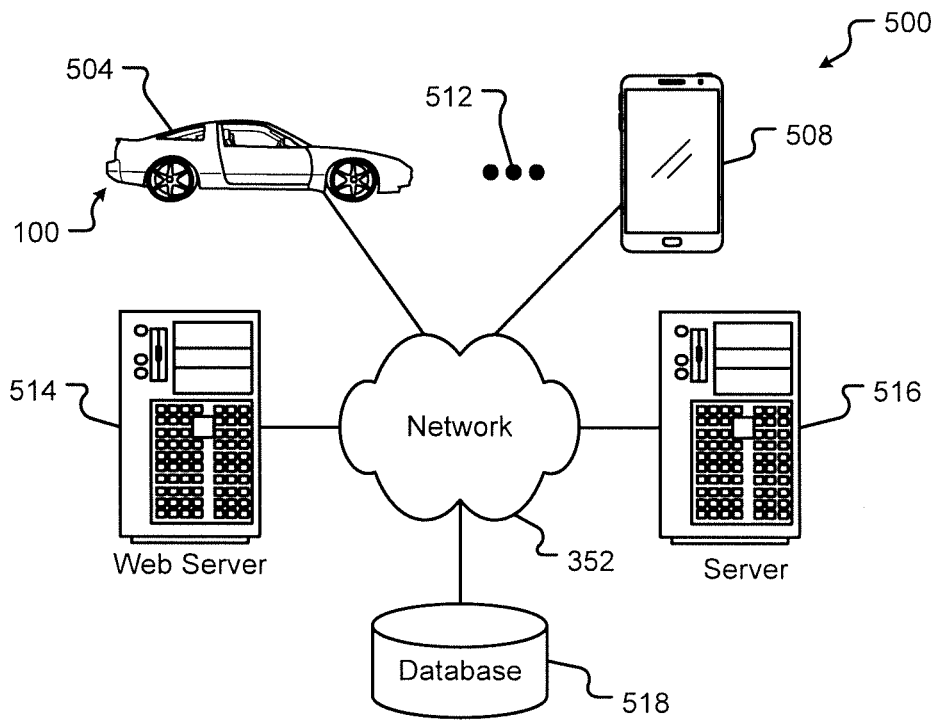
FIG. 5 is a block diagram of a computing environment associated with the embodiments presented herein.

FIG. 5 illustrates a block diagram of a computing environment 500 that may function as the servers, user computers, or other systems provided and described herein. The computing environment 500 includes one or more user computers, or computing devices, such as a vehicle computing device 504, a communication device 508, and/or more 512. The computing devices 504, 508, 512 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 504, 508, 512 may also have any of a variety of applications, including for example, database client and/or server applications, and web browser applications. Alternatively, the computing devices 504, 508, 512 may be any other electronic device, such as a thin-client computer, Internet-enabled mobile telephone, and/or personal digital assistant, capable of communicating via a network 352 and/or displaying and navigating web pages or other types of electronic documents or information. Although the exemplary computing environment 500 is shown with two computing devices, any number of user computers or computing devices may be supported.

The computing environment 500 may also include one or more servers 514, 516. In this example, server 514 is shown as a web server and server 516 is shown as an application server. The web server 514, which may be used to process requests for web pages or other electronic documents from computing devices 504, 508, 512. The web server 514 can be running an operating system including any of those discussed above, as well as any commercially-available server operating systems. The web server 514 can also run a variety of server applications, including SIP (Session Initiation Protocol) servers, HTTP(s) servers, FTP servers, CGI servers, database servers, Java® servers, and the like. In some instances, the web server 514 may publish operations available operations as one or more web services.

The computing environment 500 may also include one or more file and or/application servers 516, which can, in addition to an operating system, include one or more applications accessible by a client running on one or more of the computing devices 504, 508, 512. The server(s) 516 and/or 514 may be one or more general purpose computers capable of executing programs or scripts in response to the computing devices 504, 508, 512. As one example, the server 516, 514 may execute one or more web applications. The web application may be implemented as one or more scripts or programs written in any programming language, such as Java®, C, C#®, or C++, and/or any scripting language, such as Perl, Python, or TCL, as well as combinations of any programming/scripting languages. The application server(s) 516 may also include database servers, including without limitation those commercially available from Oracle®, Microsoft®, Sybase®, IBM® and the like, which can process requests from database clients running on a computing device 504, 508, 512.

The web pages created by the server 514 and/or 516 may be forwarded to a computing device 504, 508, 512 via a web (file) server 514, 516. Similarly, the web server 514 may be able to receive web page requests, web services invocations, and/or input data from a computing device 504, 508, 512 (e.g., a user computer, etc.) and can forward the web page requests and/or input data to the web (application) server 516. In further embodiments, the server 516 may function as a file server. Although for ease of description, FIG. 5 illustrates a separate web server 514 and file/application server 516, those skilled in the art will recognize that the functions described with respect to servers 514, 516 may be performed by a single server and/or a plurality of specialized servers, depending on implementation-specific needs and parameters. The computer systems 504, 508, 512, web (file) server 514 and/or web (application) server 516 may function as the system, devices, or components described in FIGS. 1-5.

The computing environment 500 may also include a database 518. The database 518 may reside in a variety of locations. By way of example, database 518 may reside on a storage medium local to (and/or resident in) one or more of the computers 504, 508, 512, 514, 516. Alternatively, it may be remote from any or all of the computers 504, 508, 512, 514, 516, and in communication (e.g., via the network 352) with one or more of these. The database 518 may reside in a storage-area network ("SAN") familiar to those skilled in the art. Similarly, any necessary files for performing the functions attributed to the computers 504, 508, 512, 514, 516 may be stored locally on the respective computer and/or remotely, as appropriate. The database 518 may be a relational database, such as Oracle 20i®, that is adapted to store, update, and retrieve data in response to SQL-formatted commands.

Figure 6:
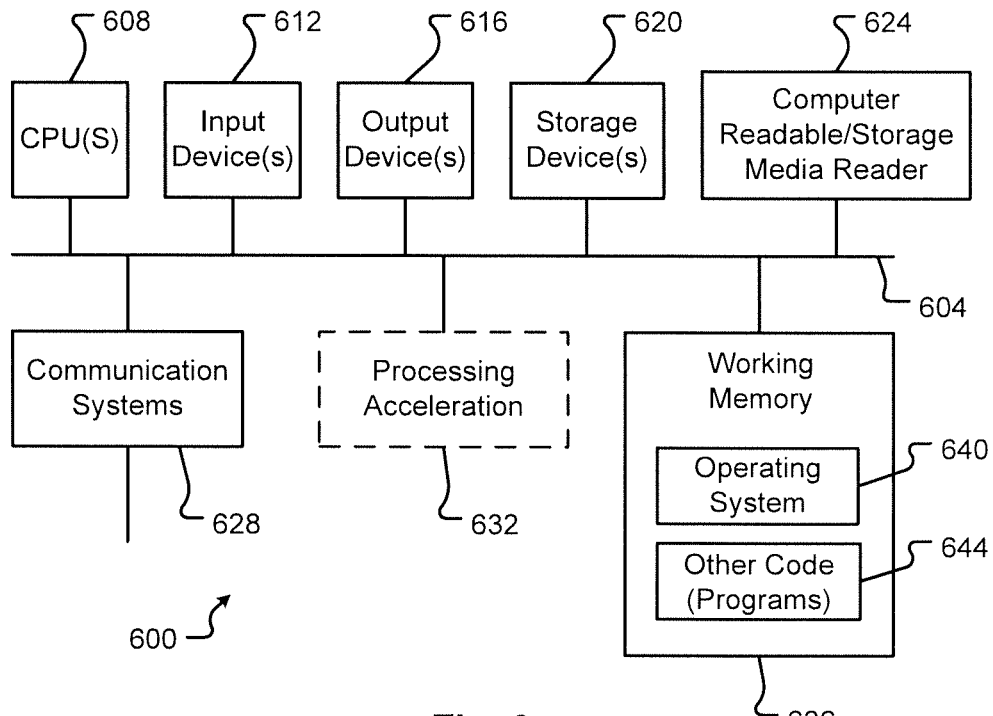
FIG. 6 is a block diagram of a computing device associated with one or more components described herein.

FIG. 6 illustrates one embodiment of a computer system 600 upon which the servers, user computers, computing devices, or other systems or components described above may be deployed or executed. The computer system 600 is shown comprising hardware elements that may be electrically coupled via a bus 604. The hardware elements may include one or more central processing units (CPUs) 608; one or more input devices 612 (e.g., a mouse, a keyboard, etc.); and one or more output devices 616 (e.g., a display device, a printer, etc.). The computer system 600 may also include one or more storage devices 620. By way of example, storage device(s) 620 may be disk drives, optical storage devices, solid-state storage devices such as a random access memory ("RAM") and/or a read-only memory ("ROM"), which can be programmable, flash-updateable and/or the like.

The computer system 600 may additionally include a computer-readable storage media reader 624; a communications system 628 (e.g., a modem, a network card (wireless or wired), an infra-red communication device, etc.); and working memory 636, which may include RAM and ROM devices as described above. The computer system 600 may also include a processing acceleration unit 632, which can include a DSP, a special-purpose processor, and/or the like.

The computer-readable storage media reader 624 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 628 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 600 may also comprise software elements, shown as being currently located within a working memory 636, including an operating system 640 and/or other code 644. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 608 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 7:
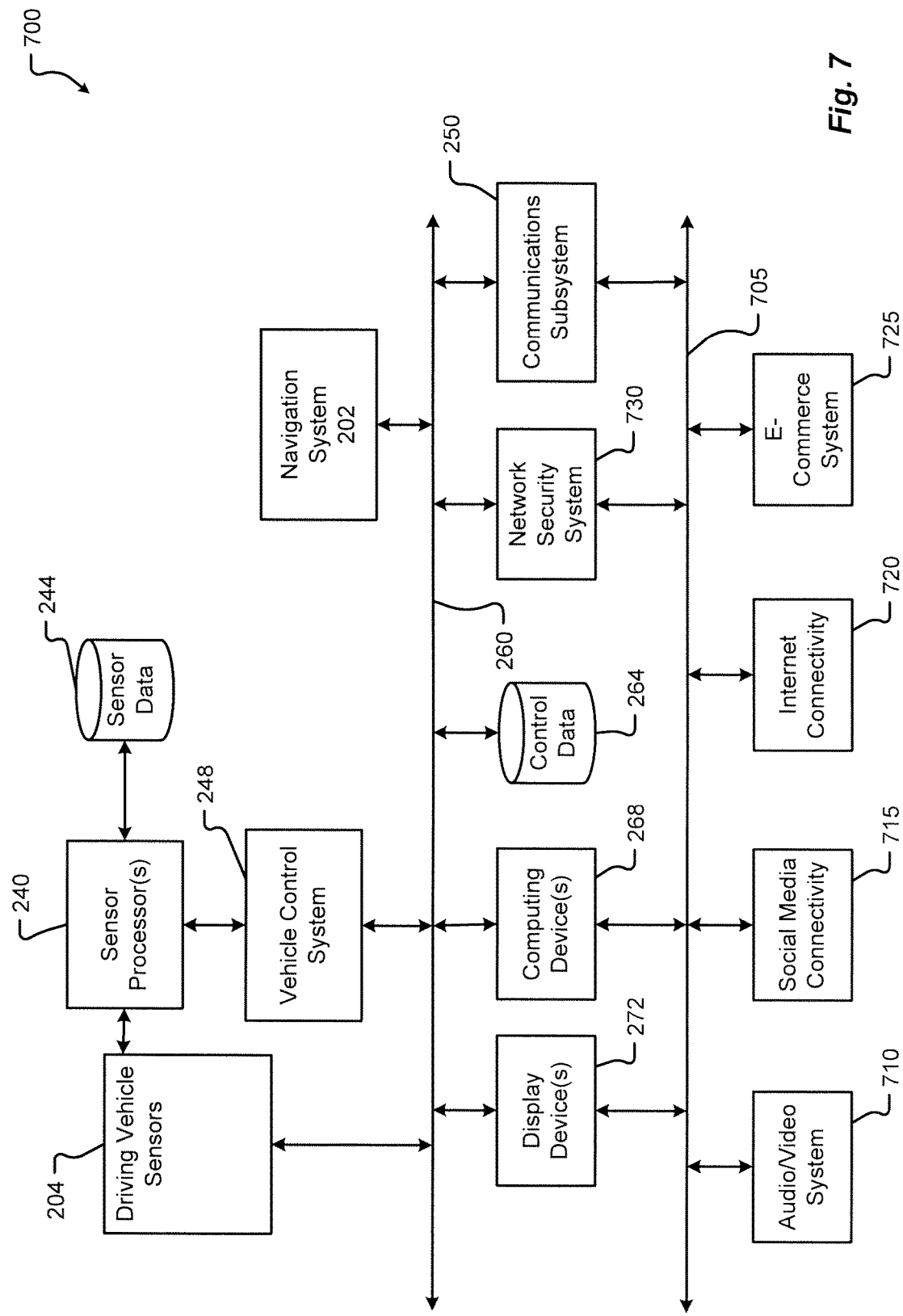
FIG. 7 is a block diagram illustrating additional details of an embodiment of a communication environment of the vehicle in accordance with embodiments of the present disclosure.

FIG. 7 is a block diagram illustrating additional details of an embodiment of a communication environment of the vehicle in accordance with embodiments of the present disclosure. Similar to FIG. 2 described in detail above, the communication system 700 here may include one or more vehicle driving vehicle sensors and systems 204, sensor processors 240, sensor data memory 244, vehicle control system 248, communications subsystem 250, control data 264, computing devices 268, display devices 272, and other components 274 that may be associated with a vehicle 100. These associated components may be electrically and/or communicatively coupled to one another via at least one bus 260. As noted, this bus 260 or network can comprise, for example, a Controller Area Network (CAN) of the vehicle 100. In addition to the vehicle control system 248 and other elements illustrated here and described above, the CAN may also connect with the Electronic Control Unit (ECU) for a variety of vehicle components and systems including but not limited to the engine ECU, transmission ECU, anti-lock braking ECU, etc.

As illustrated here, the communication system 700 can include another bus or network 705. For example, this network can comprise an in-vehicle entertainment and/or information, i.e., "infotainment," network 705. This network 705 can be connected with the communication subsystem 250 as described above and access one or more other networks outside of the vehicle. The communication system 700 can also include a number of other components that can use the entertainment and/or information network 705 to provide, individually or by operating in conjunction, a wide range of features and functions to users of the vehicle. For example, the communication system 700 can include an audio/video system providing audio and/or video media information and/or entertainment through the entertainment and/or information network 705. A social media connectivity component 715 can provide access to one or more common social media networks. An Internet connectivity component 720 can provide access to the Internet and allow for browsing, downloading of content, or other common activities. An e-commerce system 725 may provide functions for making online or other payments and handling other e-commerce activities.

While these and other components of the communication system 700 provide information, entertainment, conveniences, and other benefits previously unimaginable, they can also present certain risks and vulnerabilities. For example, malicious, unauthorized access to the entertainment and/or information network 705 can compromise personal information possibly leading to identify theft. In the case of an autonomous or semi-autonomous vehicle as described above, these risks and vulnerabilities are not only security and privacy concerns but are also significant personal and public safety concerns.

To address these concerns and secure the networks 260 and 705, systems, and components of the communication system 700 and vehicle 100, security credentials such as a key (e.g., used in a symmetric or asymmetric cryptosystem, such as a Public Key Infrastructure (PKI), RSA, Digital Signature Algorithm (DSA), PGP, and GnuPG, among others), can be used to control access, sign communications, etc. as known in the art. A key is a piece of information or a parameter that determines the functional output of a cryptographic algorithm (e.g., transforms plaintext into ciphertext) or causes other types of transformations (e.g., in cryptographic algorithms such as digital signature schemes and message authentication codes). Commonly, the key has a key length of at least about 80 bits and is included in or configured as a certificate. As will be appreciated, PKI is a system for the creation, storage, and distribution of digital certificates including asymmetric keys, which can be used to verify that a particular public key belongs to a certain entity. In an asymmetric key encryption scheme, anyone can encrypt messages using the public key, but only the holder of the paired private key can decrypt. A PKI certification authority creates digital certificates, which map public keys maintained by the certification authority to registered entities and securely stores these certificates in a central repository and revokes them if needed. For example, private keys in certificates maintained by the various networks and systems in the vehicle 100 can be used to authenticate and authorize access to only those requests or other communications providing a corresponding asymmetric public key. In addition to or instead of PKI certificates, other types of public or private certificates or security credentials may be used including but not limited to Secure Socket Layer (SSL) certificates such as Domain Validated (DV) certificates, Organization Validated (OV) certificates, Extended Validation (EV) certificates, etc. As used herein, a security credential can comprise a certificate or other set of information, e.g., a set of stored biometric or other information, used to uniquely identify and entity and/or authenticate and/or authorize access to a network or system of the vehicle 100.

However, these credentials are also vulnerable to attack. Therefore, and according to one embodiment, the communication system 700 can also include a network security system 730. Generally speaking, the network security system 730 can provide monitoring of the networks 260 and 705, systems, and components of the vehicle 100 and perform one or more checks to determine whether the certificates or other credentials used by the systems and components of the vehicle 100 have been modified or tampered with.

For example, the network security system 730 can monitor the certificates or other credentials loaded to the various components and systems of the vehicle 100 and save a set of information identifying those certificates or credentials that are expected to be present and/or in use. Periodically, on request, or upon the occurrence of an event or condition, the network security system 730 can perform checks on the certificates individually or in the aggregate to determine whether the certificates present and/or in use are those expected based on the saved set of information. If a change is detected by these checks, i.e., a difference between the current set of certificates and the saved set of information, the network security system 730 can take some action. The action, depending on the nature of the change detected, can vary from recording and/or reporting the condition up to and including isolating or even disabling a particular component or system on which the changed certificate is used.

Figure 8:
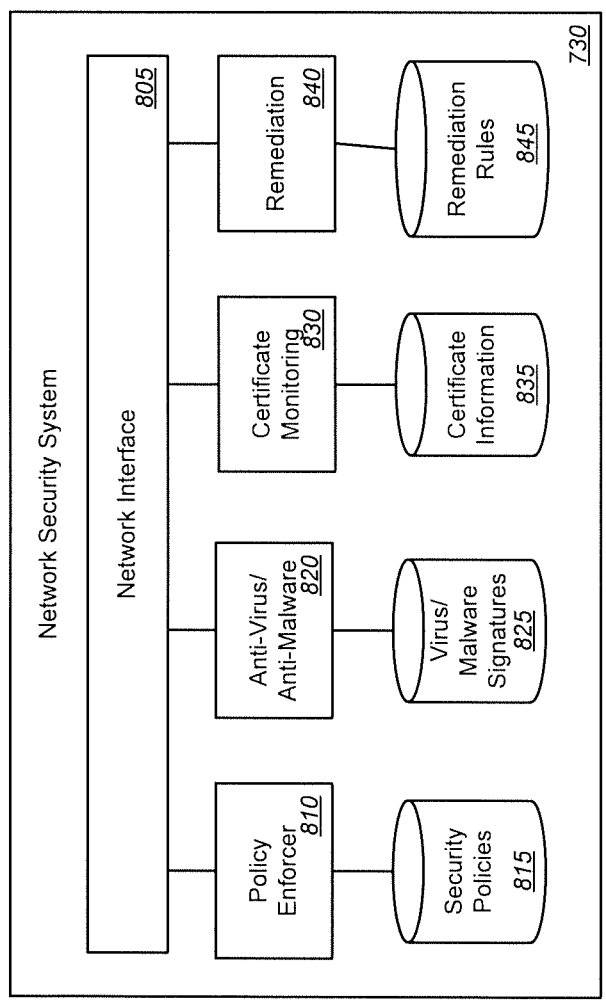
FIG. 8 is a block diagram illustrating elements of an exemplary vehicle network security system according to one embodiment of the present disclosure.

FIG. 8 is a block diagram illustrating elements of an exemplary vehicle network security system according to one embodiment of the present disclosure. As illustrated in this example, the network security system 730 can comprise a network interface 805. As noted above, the network security system 730 can be connected with any one or more or all of the networks within the vehicle including but not limited to one or more CANs, an entertainment and information network, and/or any other communication network or data bus within the vehicle. The network interface 805 can comprise one or more Network Interface Controllers (NICs), protocol adapters, and/or other hardware and/or software to connect with and communicate on the networks of the vehicle.

The network security system 730 can also comprise a policy enforcer 810 and a local or remote repository of security policies 815. The policy enforcer 810 can maintain and execute security policies 815 on use of one or more or all of the networks and/or network connected components of the vehicle. Each of the security policies 815 can comprise a set of conditions and associated actions to be applied upon satisfaction of those conditions. The actions can, in some cases, be functions, processes, or other operations to deny or grant access to the networks of the vehicle and/or otherwise maintain known safe conditions on the networks. For example, one or more security policies may define and enforce aging and renewal of certificates used for authentication and authorization of users, applications, components, etc. using the networks. Other policies may define or control the authentication and authorization. Yet other security policies may define, for example, timeouts for access attempts, automatic closure of open ports after a certain time period, etc. Still other one or more policies can define a role-based access control scheme for users and/or components accessing the vehicle networks. Any number and variety of other policies can be implemented and are considered to be within the scope of the present disclosure.

The network security system 730 can also comprise an anti-virus and/or anti-malware detection component 820. Generally speaking, the anti-virus and/or anti-malware detection component 820 can monitor the networks of the vehicle for suspicious activity such as computer viruses, spyware, adware, and other malicious objects in real-time. Use of the networks of the vehicle can be monitored by algorithms and heuristics of the anti-virus and/or anti-malware detection component 820 based on a locally or remotely stored set of virus and/or malware signatures 825. The anti-virus and/or anti-malware detection component 820 can monitor for various types of threats including but not limited to malicious browser helper objects (BHOs), browser hijackers, ransomware, keyloggers, backdoors, rootkits, trojan horses, worms, adware, spyware, infected and malicious URLs, spam, scam and phishing attacks, online identity (privacy), online banking attacks, social engineering techniques, and others.

The network security system 730 can also comprise a certificate monitoring component 830. Generally speaking, the certificate monitoring component 830 can monitor certificates or other credentials loaded to various components and systems of a vehicle. More specifically, various components and systems of the vehicle can receive and maintain credentials, such as a set of certificates or keys. Each credential can comprise a key value and a set of one or more attributes identifying the credential. For example, the attributes can comprise one or more of an identifying name or number, an identification of an owner of the credential, an identification of an issuer of the credential, a date and time when the certificate becomes valid, a date and time when the certificate expires, an indication of usage of the credential, an indication of a signature algorithm used to sign the credential, or a signature by an issuer of the credential.

The certificate monitoring component 830 can maintain information related to and identifying each credential of the plurality of credentials. The information related to and identifying each credential can be maintained by the certificate monitoring component in a secure store or other repository 835 separate from the credentials. For example, the maintained information 835 related to and identifying each credential of the plurality of credentials can comprises information identifying individual certificates such as values for at least one of the one or more attributes of each certificate. Additionally or alternatively, the information 835 can comprise information identifying the plurality of certificates in the aggregate. For example, the information 835 can comprise an indication of the total number of certificates in the plurality of certificates. In other cases, the information 835 can additionally or alternatively comprise information representing the aggregated data set comprising the certificates, e.g., a hash value generated by applying a hash function to the plurality of certificates.

Using the maintained information 835 identifying the certificates, the certificate monitoring component 830 can perform one or more checks on the credentials. The one or more checks can be performed by the certificate monitoring component 830 upon a system boot, periodically, or based on satisfaction of a condition defined in a rule. The checks can comprise one or more checks on the plurality of credentials together and/or one or more checks on each credential individually. For example, the checks can comprise checking the saved hash value, if any, against a new hash of the data set comprising the plurality of certificates and/or checking the current total number of certificates against the saved total number of certificates. Additionally or alternatively, the checks can comprise checking individual certificates by comparing saved information identifying each certificate, e.g., the attribute values, to the current attributes of the corresponding certificate.

Based on performing the one or more checks, the certificate monitoring component 830 can make a determination 920 as to whether one or more of the credentials have been changed. According to one embodiment, determining whether one or more of the credentials have changed can comprise determining a total number of credentials in the plurality of credential has changed and/or a hash value for the data set comprising the plurality of credentials has changed. Additionally or alternatively, determining whether one or more of the credentials have changed can comprise determining one or more attributes of one or more credentials have changed. A variety of other checks can additionally or alternatively be performed and considered to be within the scope of the present disclosure.

The network security system 730 can also comprise a remediation component 840. Generally speaking, the remediation component 840 can perform one or more actions in response to determining one or more of the credentials have changed. The actions performed can be based on the determined change. In some cases, a set of remediation rules 845 can be used by the remediation component to determine an action to be taken for a defined condition. For example, if a particular certificate is found by the certificate monitoring component 830 to be newer than the stored certificate information 835 indicates, that certificate may have been replaced or otherwise changed unexpectedly. In such cases, the remediation rules can define particular actions to take to, for example, report the detected change, revoke or invalidate that certificate, isolate a component or system to which that certificate is assigned, etc. A variety of other actions are contemplated and considered to be within the scope of the present disclosure.

Figure 9:
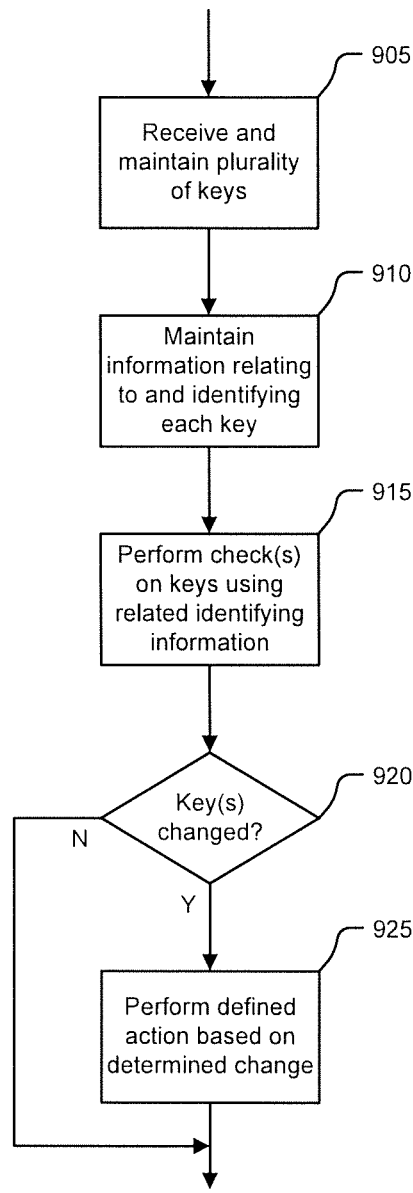
FIG. 9 is a flowchart illustrating an exemplary process for detecting use of unauthorized certificates according to one embodiment of the present disclosure.

FIG. 9 is a flowchart illustrating an exemplary process for detecting use of unauthorized certificates according to one embodiment of the present disclosure. As illustrated in this example, detecting potential tampering with security features of a vehicle can comprise receiving and maintaining 905 a plurality of credentials, such as a set of certificates or keys. Each credential can comprise a key value and a set of one or more attributes identifying the credential. For example, the attributes can comprise one or more of an identifying name or number, an identification of an owner of the credential, an identification of an issuer of the credential, a date and time when the certificate becomes valid, a date and time when the certificate expires, an indication of usage of the credential, an indication of a signature algorithm used to sign the credential, or a signature by an issuer of the credential.

Information related to and identifying each credential of the plurality of credentials can be maintained 910 separate from the credentials. For example, the maintained information related to and identifying each credential of the plurality of credentials comprises values for at least one of the one or more attributes identifying each credential.

One or more checks can be performed 915 on the credentials using the maintained information. The one or more checks can be performed 915 upon a system boot, periodically, or based on satisfaction of a condition defined in a rule. The checks can comprise one or more checks on the plurality of credentials together and/or one or more checks on each credential individually.

A determination 920 can be made as to whether one or more of the credentials have been changed based on performing 915 the one or more checks. According to one embodiment, determining 920 whether one or more of the credentials have changed can comprise determining a total number of credentials in the plurality of credential has changed. Additionally or alternatively, determining 920 whether one or more of the credentials have changed can comprise determining one or more attributes of one or more credentials have changed. In response to determining 920 one or more of the credentials have changed, one or more actions can be performed 925 based on the determined change. For example, the performed 925 actions can comprise a remedial action defined for the determined change.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for detecting potential tampering with security features of a vehicle, the method comprising: maintaining a plurality of credentials, each credential comprising a key value and a set of one or more attributes identifying the credential; maintaining, separate from the credentials, information related to and identifying each credential of the plurality of credentials; performing one or more checks on the credentials using the maintained information; and determining whether one or more of the credentials have been changed based on the one or more checks.

Aspects of the above method include wherein the maintained information related to and identifying each credential of the plurality of credentials comprises values for at least one of the one or more attributes identifying each credential.

Aspects of the above method include wherein the attributes comprise one or more of an identifying name or number, an identification of an owner of the credential, an identification of an issuer of the credential, a date and time when the certificate becomes valid, a date and time when the certificate expires, an indication of usage of the credential, an indication of a signature algorithm used to sign the credential, or a signature by an issuer of the credential.

Aspects of the above method include wherein the one or more checks are performed upon a system boot, periodically, or based on satisfaction of a condition defined in a rule.

Aspects of the above method include wherein the checks comprise one or more checks on the plurality of credentials together and one or more checks on each credential individually.

Aspects of the above method include wherein determining whether one or more of the credentials have changed comprises determining a total number of credentials in the plurality of credential has changed or determining one or more attributes of one or more credentials have changed.

Aspects of the above method further include in response to determining one or more of the credentials have changed, performing an action based on the determined change.

Aspects of the above method include wherein the performed action comprises a remedial action defined for the determined change.

Embodiments include a vehicle comprising a processor and a memory coupled with and readable by the processor and storing therein a set of instructions which, when executed by the processor, causes the processor to detect potential tampering with security features of the vehicle by: maintaining a plurality of credentials, each credential comprising a key value and a set of one or more attributes identifying the credential; maintaining, separate from the credentials, information related to and identifying each credential of the plurality of credentials; performing one or more checks on the credentials using the maintained information; and determining whether one or more of the credentials have been changed based on the one or more checks.

Aspects of the above vehicle include wherein the maintained information related to and identifying each credential of the plurality of credentials comprises values for at least one of the one or more attributes identifying each credential and wherein the attributes comprise one or more of an identifying name or number, an identification of an owner of the credential, an identification of an issuer of the credential, a date and time when the certificate becomes valid, a date and time when the certificate expires, an indication of usage of the credential, an indication of a signature algorithm used to sign the credential, or a signature by an issuer of the credential.

Aspects of the above vehicle include wherein the one or more checks are performed upon a system boot, periodically, or based on satisfaction of a condition defined in a rule.

Aspects of the above vehicle include wherein the checks comprise one or more checks on the plurality of credentials together and one or more checks on each credential individually.

Aspects of the above vehicle include wherein determining whether one or more of the credentials have changed comprises determining a total number of credentials in the plurality of credential has changed or determining one or more attributes of one or more credentials have changed.

Aspects of the above vehicle further include in response to determining one or more of the credentials have changed, performing an action based on the determined change and wherein the performed action comprises a remedial action defined for the determined change.

Embodiments include a non-transitory computer-readable medium comprising a set of instructions stored therein which, when executed by a processor, causes the processor to detect potential tampering with security features of the vehicle by: maintaining a plurality of credentials, each credential comprising a key value and a set of one or more attributes identifying the credential; maintaining, separate from the credentials, information related to and identifying each credential of the plurality of credentials; performing one or more checks on the credentials using the maintained information; and determining whether one or more of the credentials have been changed based on the one or more checks.

Aspects of the above non-transitory computer-readable medium include wherein the maintained information related to and identifying each credential of the plurality of credentials comprises values for at least one of the one or more attributes identifying each credential and wherein the attributes comprise one or more of an identifying name or number, an identification of an owner of the credential, an identification of an issuer of the credential, a date and time when the certificate becomes valid, a date and time when the certificate expires, an indication of usage of the credential, an indication of a signature algorithm used to sign the credential, or a signature by an issuer of the credential.

Aspects of the above non-transitory computer-readable medium include wherein the one or more checks are performed upon a system boot, periodically, or based on satisfaction of a condition defined in a rule.

Aspects of the above non-transitory computer-readable medium include wherein the checks comprise one or more checks on the plurality of credentials together and one or more checks on each credential individually.

Aspects of the above non-transitory computer-readable medium include wherein determining whether one or more of the credentials have changed comprises determining a total number of credentials in the plurality of credential has changed or determining one or more attributes of one or more credentials have changed.

Aspects of the above non-transitory computer-readable medium further include in response to determining one or more of the credentials have changed, performing an action based on the determined change and wherein the performed action comprises a remedial action defined for the determined change.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method for detecting potential tampering with security features of a vehicle the method comprising:
   maintaining, by one or more systems of the vehicle, a plurality of credentials, each credential comprising a key value and a set of one or more attributes identifying the credential and each credential being associated with a component of a plurality of components of the vehicle connected with a communications network of the vehicle and used by the component to access the communications network;
   maintaining, by a network security system of the vehicle, separate from the credentials, information related to and identifying each credential of the plurality of credentials;
   performing, by the network security system, a plurality of checks on the credentials using the maintained information, wherein the plurality of checks comprise one or more checks on each of the plurality of credentials individually and one or more checks on the plurality of credentials together in aggregate, wherein the one or more checks on each of the plurality of credentials individually comprises at least a check to determine whether one or more attributes of the credential has changed since last performing the plurality of checks, and wherein the one or more checks on the plurality of credentials together in aggregate comprises at least a check to determine whether a total number for the plurality of credentials has changed since last performing the plurality of checks; and
   determining, by the network security system, whether one or more of the credentials have been changed based on the one or more checks.

2. The method of claim 1, wherein the maintained information related to and identifying each credential of the plurality of credentials comprises values for at least one of the one or more attributes identifying each credential.

3. The method of claim 2, wherein the attributes comprise a plurality of an identifying name or number, an identification of an owner of the credential, an identification of an issuer of the credential, a date and time when the credential becomes valid, a date and time when the credential expires, an indication of usage of the credential, an indication of a signature algorithm used to sign the credential, or a signature by an issuer of the credential.

4. The method of claim 1, wherein the one or more checks are performed upon a system boot, periodically, or based on satisfaction of a condition defined in a rule.

5. The method of claim 1, further comprising, in response to determining one or more of the credentials have changed, performing an action based on the determined change.

6. The method of claim 5, wherein the performed action comprises identifying a component of the plurality of components using the one or more credentials that have changed to access the communications network of the vehicle and isolating the identified one or more components from the communications network.

7. A vehicle comprising:
   a processor; and
   a memory coupled with and readable by the processor and storing therein a set of instructions which, when executed by the processor, causes the processor to detect potential tampering with security features of the vehicle by:
   maintaining a plurality of credentials, each credential comprising a key value and a set of one or more attributes identifying the credential and each credential being associated with a component of a plurality of components of the vehicle connected with a communications network of the vehicle and used by the component to access the communications network;
   maintaining, separate from the credentials, information related to and identifying each credential of the plurality of credentials;
   performing a plurality of checks on the credentials using the maintained information, wherein the plurality of checks comprise one or more checks on each of the plurality of credentials individually and one or more checks on the plurality of credentials together in aggregate, wherein the one or more checks on each of the plurality of credentials individually comprises at least a check to determine whether one or more attributes of the credential has changed since last performing the plurality of checks, and wherein the one or more checks on the plurality of credentials together in aggregate comprises at least a check to determine whether a total number for the plurality of credentials has changed since last performing the plurality of checks; and
   determining whether one or more of the credentials have been changed based on the one or more checks.

8. The vehicle of claim 7, wherein the maintained information related to and identifying each credential of the plurality of credentials comprises values for at least one of the one or more attributes identifying each credential and wherein the attributes comprise a plurality of an identifying name or number, an identification of an owner of the credential, an identification of an issuer of the credential, a date and time when the credential becomes valid, a date and time when the credential expires, an indication of usage of the credential, an indication of a signature algorithm used to sign the credential, or a signature by an issuer of the credential.

9. The vehicle of claim 7, wherein the one or more checks are performed upon a system boot, periodically, or based on satisfaction of a condition defined in a rule.

10. The vehicle of claim 7, further comprising, in response to determining one or more of the credentials have changed, identifying a component of the plurality of components using the one or more credentials that have changed to access the communications network of the vehicle and isolating the identified one or more components from the communications network.

11. A non-transitory computer-readable medium comprising a set of instructions stored therein which, when executed by a processor, causes the processor to detect potential tampering with security features of the vehicle by:
   maintaining a plurality of credentials, each credential comprising a key value and a set of one or more attributes identifying the credential and each credential being associated with a component of a plurality of components of the vehicle connected with a communications network of the vehicle and used by the component to access the communications network;
   maintaining, separate from the credentials, information related to and identifying each credential of the plurality of credentials;
   performing a plurality of checks on the credentials using the maintained information, wherein the plurality of checks comprises one or more checks on each of the plurality of credentials individually and one or more checks on the plurality of credentials together in aggregate, wherein the one or more checks on each of the plurality of credentials individually comprises at least a check to determine whether one or more attributes of the credential has changed since last performing the plurality of checks, and wherein the one or more checks on the plurality of credentials together in aggregate comprises at least a check to determine whether a total number for the plurality of credentials has changed since last performing the plurality of checks; and determining whether one or more of the credentials have been changed based on the one or more checks.

12. The non-transitory computer-readable medium of claim 11, wherein the maintained information related to and identifying each credential of the plurality of credentials comprises values for at least one of the one or more attributes identifying each credential and wherein the attributes comprise a plurality of an identifying name or number, an identification of an owner of the credential, an identification of an issuer of the credential, a date and time when the credential becomes valid, a date and time when the credential expires, an indication of usage of the credential, an indication of a signature algorithm used to sign the credential, or a signature by an issuer of the credential.

13. The non-transitory computer-readable medium of claim 11, wherein the one or more checks are performed upon a system boot, periodically, or based on satisfaction of a condition defined in a rule.

14. The non-transitory computer-readable medium of claim 11, further comprising, in response to determining one or more of the credentials have changed, identifying a component of the plurality of components using the one or more credentials that have changed to access the communications network of the vehicle and isolating the identified one or more components from the communications network.

* * * * *